(12) United States Patent
Roschy et al.

(10) Patent No.: US 10,321,703 B2
(45) Date of Patent: Jun. 18, 2019

(54) THERMAL TREATMENT DEVICE AND A THERMAL TREATMENT METHOD

(71) Applicant: KHS GmbH, Dortmund (DE)

(72) Inventors: Johannes Roschy, Bad Kreuznach (DE); Tobias Cherdron, Bad Kreuznach (DE); Christopher Neuhaus, Wiesbaden (DE)

(73) Assignee: KHS GmbH, Dortmund (DE)

( * ) Notice: Subject to any disclaimer, the term of this patent is extended or adjusted under 35 U.S.C. 154(b) by 219 days.

(21) Appl. No.: 15/324,867

(22) PCT Filed: Jun. 2, 2015

(86) PCT No.: PCT/EP2015/062186
§ 371 (c)(1),
(2) Date: Jan. 9, 2017

(87) PCT Pub. No.: WO2016/005109
PCT Pub. Date: Jan. 14, 2016

(65) Prior Publication Data
US 2017/0202253 A1    Jul. 20, 2017

(30) Foreign Application Priority Data
Jul. 9, 2014 (DE) .......... 10 2014 109 608

(51) Int. Cl.
| A23L 3/18 | (2006.01) |
| A23L 5/00 | (2016.01) |
| A23L 2/46 | (2006.01) |
| A23L 3/22 | (2006.01) |
| A23L 29/30 | (2016.01) |

(Continued)

(52) U.S. Cl.
CPC .................... *A23L 3/18* (2013.01); *A23L 2/46* (2013.01); *A23L 2/56* (2013.01); *A23L 3/22* (2013.01); *A23L 5/00* (2016.08); *A23L 29/30* (2016.08); *C13B 25/00* (2013.01); *F28D 21/00* (2013.01); *F28F 27/02* (2013.01);
(Continued)

(58) Field of Classification Search
CPC ..... A23L 2/00; A23L 3/18; A23L 5/00; A23L 2/56; A23L 29/30; A23L 2/46; A23L 3/22; F28D 21/00; F28D 2021/0042; F28F 27/02; F28F 2250/06; A23C 19/0973
See application file for complete search history.

(56) References Cited

U.S. PATENT DOCUMENTS 4,997,662 A * 3/1991 Lidman ............... A23C 3/033
426/231
8,691,310 B2 * 4/2014 Leufstedt .............. A23L 3/20
422/1

FOREIGN PATENT DOCUMENTS

DE      19 24 519      11/1970
DE   10 2009 007 220    8/2010
(Continued)

OTHER PUBLICATIONS

Matsuoka, Method for Producing Pasteurized Liquid Egg, Jun. 30, 2011, JP2011125225A, Whole Document (Year: 2011).*

*Primary Examiner* — Larry L Furdge
(74) *Attorney, Agent, or Firm* — Occhiuti & Rohlicek LLP

(57) ABSTRACT

A thermal treatment apparatus includes a pair of heat exchangers and an intake that receives a main flow of filling material and a branch that diverts filling material to form a branch flow. The branch flow takes a part of the heat energy (Continued)

used in a primary process for use in a secondary process. It then rejoins the main flow.

20 Claims, 1 Drawing Sheet

(51) Int. Cl.
*A23L 2/56* (2006.01)
*C13B 25/00* (2011.01)
*F28D 21/00* (2006.01)
*F28F 27/02* (2006.01)

(52) U.S. Cl.
CPC .. *A23V 2002/00* (2013.01); *F28D 2021/0042* (2013.01); *F28F 2250/06* (2013.01)

(56) References Cited

FOREIGN PATENT DOCUMENTS

| DE | 10 2012 024 806 | | 6/2014 |
|---|---|---|---|
| EP | 2 674 718 | | 12/2013 |
| JP | 2011125255 A | * | 6/2011 |

\* cited by examiner

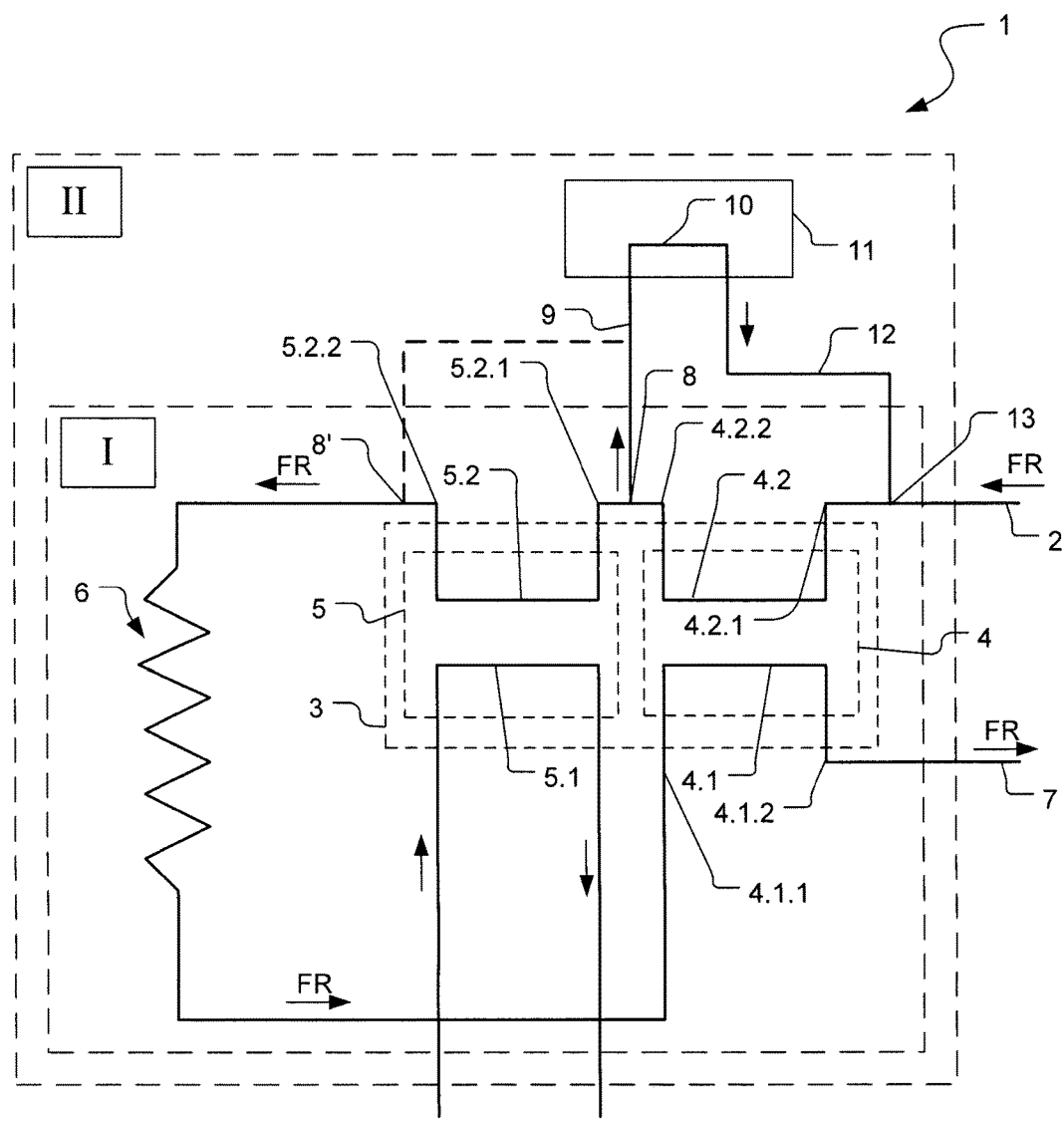

THERMAL TREATMENT DEVICE AND A THERMAL TREATMENT METHOD

RELATED APPLICATIONS

This application is the national stage under 35 USC 371 of international application PCT/EP2015/062186, filed on Jun. 2, 2015, which claims the benefit of the Jul. 9, 2014 priority date of German application DE 102014109608.8, the contents of which are herein incorporated by reference.

FIELD OF INVENTION

The invention relates to thermal treatment, and in particular, to recapture of thermal energy.

BACKGROUND

A known method of thermal treatment, pasteurization, involves heating a filling material for a short period to temperatures of up to 100° C. to increase their shelf life. This, and similar processes, are carried out in thermal-treatment devices.

In an effort to save energy costs, known thermal-treatment devices include a heat exchanger having a primary and secondary side. Filling material that has been pasteurized flows through the primary side. Filling material that has yet to be pasteurized flows through the secondary side. This reduces the energy required to pasteurize by making use of residual thermal energy that flows from the primary side to the secondary side.

One disadvantage of known thermal-treatment devices is that one cannot use as much of the residual heat as one would like. This is because of limits in economically feasible sizes of the heat exchanger. As a result, only a limited portion of the available residual thermal energy from the pasteurized filling material can be transferred to the yet to be pasteurized filling material.

SUMMARY

An object of the invention is to provide a thermal-treatment device that promotes recapture of heat.

According to a first aspect, the invention relates to a device for the thermal treatment of a liquid or viscous filling material as a primary process. This primary process can, for example, be the pasteurization of sugar syrup or a similar filling material or filling material constituent. The device comprises a first and a second heat-exchanger, which in each case comprise a primary side and a secondary side. The primary side of the heat exchanger in the meaning of the invention is understood to be the side of the heat exchanger through which the medium that emits the thermal energy flows. Correspondingly, the secondary side of a heat exchanger is understood to be the side of the heat exchanger through which the medium absorbing the thermal energy flows. The first and second heat-exchangers can also be realized in a heat-exchanger arrangement that comprises a first heat-exchanger compartment and a second heat-exchanger compartment, wherein the heat exchanger compartments in each case exhibit the functional performance of individual heat exchangers. The secondary-side inlet of the first heat-exchanger, i.e. the inlet to the secondary side of the first heat-exchanger, is connected to the inlet of the thermal treatment device, by means of which the liquid or viscous filling material constituent or the filling material is delivered to the thermal treatment device. Additionally, the secondary-side outlet of the first heat-exchanger is connected to the secondary-side inlet of the second heat-exchanger. The secondary-side outlet of the second heat-exchanger is coupled to a primary-process section, and the primary-process section is connected on the outlet side to the primary side of the first heat-exchanger. A branch arrangement is provided between the outlet of the first heat-exchanger and the primary-process section, by means of which a branch flow or part flow of the liquid or viscous filling material constituent is branched off or guided off. This branch is connected to the inlet of a further heat exchanger section, which is allocated to a secondary process, such that, by way of the further heat exchanger section, the thermal energy contained in the part flow of the filling material constituent is delivered to this secondary process. The outlet of the further heat exchanger section is connected to the secondary-side inlet of the first heat-exchanger, such that, after running through the heat exchanger section the part flow that is guided off again flows through the first heat-exchanger, and is preferably mixed with a filling material flow that is delivered via the inlet of the thermal treatment device.

A major advantage of the thermal treatment device according to the invention lies in the fact that, by branching off of a part flow of the filling material flow after the first heat-exchanger and reintroducing this part flow at the inlet of the secondary side of the first heat-exchanger, an improved heat transfer in the first heat-exchanger is achieved. Consequently, improved residual heat utilization can be provided, as a result of which the energy requirement of both the thermal treatment device and the primary process can be reduced overall. It is likewise possible for the energy costs of the secondary process to be reduced due to the fact that at least a part of the energy required for the secondary process can be taken from the primary process.

According to one exemplary embodiment, the volume flow flowing through the secondary side of the first heat-exchanger is greater than the volume flow flowing through the primary side of the heat exchanger. In other words, the flow through the heat exchanger is asymmetric, with the volume flow that emits the heat being smaller than the volume flow to which thermal energy is delivered. As a result of this asymmetry, it is possible to achieve improved heat transfer from the primary side of the first heat-exchanger to its secondary side. This leads to improved residual thermal energy utilization of the quantity of heat contained in the filling material constituent flow that has already been subjected to thermal treatment.

In some embodiments, the branch is between the first and second heat-exchangers. Among these are embodiments in which the branch is between the secondary-side outlet of the first heat-exchanger and the secondary-side inlet of the second heat-exchanger.

In some embodiments, provision is made for only a part flow of the filling material to flow through the heat exchanger section allocated to the secondary process that has already been heated by the residual heat from the filling material flow that in its turn has already been thermally treated. By changing the size of the part flow and/or changing the temperatures of the fluid flows involved, variable thermal energy quantities can be delivered to the secondary process, such as small to medium thermal energy quantities.

As an alternative, the branch can also be between the outlet of the second heat-exchanger and the inlet to the primary-process section. In this case, it is possible for greater quantities of thermal energy to be delivered to the secondary process, since the filling material, and therefore also the part flow of the filling material that is first branched off at this point, has a higher temperature downstream of the second heat-exchanger, in particular a temperature that is suitable for or even above that required for the pasteurization of the filling material, i.e. for example temperatures between 75° C. and 100° C., and in particular temperatures between 80° C. and 90° C.

Other embodiments permit control over the volume flow of the part flow that is led off by the branch. This makes it possible to control the introduction of heat into the secondary process or the degree of residual thermal energy utilization in the first heat-exchanger and to do so in accordance with requirements. In particular, such embodiments permit selection of the volume flow of the branched part flow can in such a way that the thermal energy introduced by the branched part flow in the secondary process corresponds to the thermal energy quantity required there.

In some embodiments, a heating device heats heating medium that flows through the primary part of the second heat-exchanger. This heating medium then heats the filling material flowing through the secondary side of the second heat-exchanger to a temperature that is desired for the thermal treatment, and in particular, to a temperature that is suitable for pasteurization of the filling material.

In some embodiments, the primary-process section of the thermal treatment device is a pasteurization section. On this primary-process section, for example, the filling material temperature can be held above a temperature threshold necessary for pasteurization. The length of the primary-process section is selected in this situation in such a way that the filling material flowing through the primary-process section remains there for a dwell time that is necessary for the pasteurization process. One way to form this primary-process section is to use a helical pipeline.

In other embodiments, the thermal treatment device is arranged in such a way that the first and second heat-exchangers are configured for conveying sugar syrup. In these embodiments, a heat-exchanger section is provided in a device for dissolving of sugar, in particular crystalline sugar, in a solvent, such as water. As a result, it becomes possible use one device that will both pasteurize the sugar syrup in the primary process and to make the sugar by dissolving of crystalline sugar in water as an endothermic secondary process.

In another aspect, the invention features a method for the thermal treatment of a liquid or viscous filling material constituent as a primary process. The method is carried out inside a device that comprises a first and a second heat-exchanger, with each having a primary side and a secondary side. The liquid or viscous filling material provided via an inlet is conveyed through the secondary side of the first heat-exchanger and then through the secondary side of the second heat-exchanger, wherein the liquid or viscous filling material constituent flows through a primary-process section downstream of the second heat-exchanger, and then through the primary side of the first heat-exchanger. Between the secondary side of the first heat-exchanger and the primary-process section, a part flow of the liquid or viscous filling material is branched off and delivered to a heat-exchange section to deliver thermal energy contained in the part flow to a secondary process. After flowing through the exchange section, the branched part flow returns to the inlet of the secondary side of the first heat-exchanger.

The expressions "essentially" or "approximately" in the meaning of the invention signify deviations from the exact value in each case by +/−10% preferably by +/−5% and/or deviations in the form of changes which are not of significance for the function.

Further embodiments, advantages, and possible applications of the invention are derived from the following description of exemplary embodiments and from the FIGURE. In this case, all the features described and/or graphically represented are in principle the object of the invention, alone or in any desired combination, regardless of their combination in the claims or reference to them. The contents of the claims are also constituent parts of the description.

BRIEF DESCRIPTION OF THE FIGURE

The sole FIGURE shows a schematic representation of one embodiment of a thermal treatment device.

DETAILED DESCRIPTION

The FIGURE shows a thermal-treatment device 1 for the thermal treatment of a liquid, a viscous filling material, or a filling-material constituent. Since the apparatus will operate essentially the same way regardless of which species is selected, the term "filling material" will refer to any one of these species.

The thermal-treatment device 1 comprises a first device-part I that carries out a primary process and a second device-part II that carries out a secondary process. The first and second device-parts I, II are coupled to one another in such a way as to transfer thermal energy from the primary process out of the first device-part I and into the second device-part II, thereby causing heat transfer between the primary process and the secondary process.

In some embodiments, the primary process is a short-term heating process for pasteurizing a filling material or filling material constituent. An example of a filling-material constituent is sugar syrup.

An example of a secondary process is a sugar dissolving process in which crystalline sugar dissolves in a solvent, such as water. Such dissolving processes are endothermic. This means that heat must be delivered to the process to dissolve the sugar in the solvent. The rate of dissolution is proportional to the temperature.

The thermal-treatment device 1 comprises a pipeline section that conveys filling material through the thermal-treatment device 1. Filling material enters the thermal-treatment device 1 via an intake 2 and passes into a heat-exchanger arrangement 3. The heat-exchanger arrangement 3 includes a first heat-exchanger 4 and a second heat-exchanger 5. The first heat-exchanger 4 has a primary side 4.1 and a secondary side 4.2. Similarly, the second heat-exchanger 5 has a primary side 5.1 and a secondary side 5.2.

As used herein, the "primary side" of a heat exchanger is understood to mean the side through which the medium that emits the thermal energy flows. The "secondary side" of a heat exchanger is understood to be the side through which the medium that absorbs the thermal energy flows.

The filling material delivered via the intake 2 flows in a flow direction FR through the secondary side 4.2 of the first heat-exchanger 4, and then, preferably immediately thereafter, through the secondary side 5.2 of the second heat-exchanger 5.

In some embodiments, the first heat-exchanger 4 and the second heat-exchanger 5 of the heat-exchanger arrangement 3 are independent heat-exchangers that are separated from one another but that are nevertheless in fluid communication with each other. Such fluid communication can be provided by an outside fluid-line that connects the first and second heat-exchangers 4, 5. In other embodiments, the heat-exchanger arrangement 3 includes two heat-exchanger compartments that are in fluid communication with each other. In this case, a first heat-exchanger compartment forms the first heat-exchanger 4 and a second heat-exchanger compartment forms the second heat-exchanger 5.

The intake 2 connects to an inlet 4.2.1 of the secondary side 4.2 of the first heat-exchanger. An outlet 4.2.2 of the secondary side 4.2 of the first heat-exchanger 4 connects to an inlet 5.2.1 of the secondary side 5.2 of the second heat-exchanger 5. As a result, filling material flows through the secondary sides 4.2, 5.2 of the first and second heat-exchangers 4, 5 immediately one after another.

A primary-process section 6, through which filling material flows, connects to an outlet 5.2.2 of the secondary side 5.2 of the second heat-exchanger 5. As it flows through the secondary sides 4.2, 5.2 of the first and second heat-exchangers 4, 5, the filling material heats up to a pasteurization temperature, namely a temperature between 70° C. and 100° C. A process-section length of the primary-process section 6 is adjusted to achieve the necessary dwell time for pasteurization. Depending on the length of the primary-process section 6, it may be necessary to provide a heater or insulator within the primary-process section 6 to maintain the filling material at the pasteurization temperature.

An outlet of the primary-process section 6 connects in the direction of flow FR to the primary side 4.1 of the first heat-exchanger 4. As a result, in the region of the primary-process section 6, pasteurized filling material flows through the primary side 4.1. This means that thermal energy from the pasteurized filling material transfers to the still cold filling material of the secondary side 4.2 of the first heat-exchanger 4, i.e. the filling material at the inlet. An outlet 4.1.2 of the primary side 4.1 of the first heat-exchanger 4 couples to an outlet 7 of the thermal-treatment device 1 to permit pasteurized filling material to be conveyed away for further use, such as storage or direct filling.

For external heat delivery, a heating medium flows through the primary side 5.1 of the second heat-exchanger 5. In this case, the primary side 5.1 connects to a heating device that heats the heating medium in such a way that the filling material flowing through the secondary side 5.2 heats up to the process temperature necessary for the pasteurization in the primary-process section 6 by heat emission of the heating medium when flowing through the second heat-exchanger 5. Preferably, the first and second heat exchangers 4, 5 are configured to operate in accordance with the counter-flow principle, i.e. the primary sides and secondary sides of the respective heat exchangers are flowed through in different directions by the medium emitting the heat and the medium absorbing the heat respectively.

A branch 8 located between the primary-process section 6 and the secondary side's outlet 4.2.2 diverts a portion of the flow of filling material towards the primary-process section 6 so that it instead flows to the second device-part II. This diverted portion of the flow will be referred to herein as a "branch flow." This branch flow provides thermal coupling between the first device-part I and the second device-part II.

A first pipeline 9 connects the branch 8 to a heat-exchange section 10. The branch flow flows through this heat-exchange section 10 and delivers thermal energy to a secondary-process section 11 provided in the second device-part II. As a result, the branch flow heats up any medium present in the secondary-process section 11.

In some embodiments, the secondary-process section 11 is where crystalline sugar is dissolved to make sugar syrup. The introduction of heat via the heat-exchange section 10 accelerates the dissolving process.

A second pipeline 12 couples an outlet side of the heat-exchange section 10 to the inlet 4.2.1 of the secondary side 4.2 of the first heat-exchanger 4. As a result, the branch flow, after having flowed through the heat-exchange section 10, rejoins the main input flow through the secondary side 4.2 of the first heat-exchanger 4.

The delivery of the branch flow into the secondary side 4.2 of the first heat-exchanger 4 is selected in such a way that this branch flow flows through the first heat exchanger 4 together with the filling material flow that is delivered via the intake 2. To promote this, it is useful to provide a mixer 13 or coupling piece.

The FIGURE shows one possible location of the branch 8, namely between the outlet 4.2.2 of the secondary side 4.2 of the first heat-exchanger 4 and the inlet 5.2.1 of the secondary side 5.2 of the second heat-exchanger 5. In an alternative embodiments, the branch 8' is between the outlet 5.2.2 of the secondary side 5.2 of the second heat-exchanger 5 and the primary-process section 6.

Assuming that a filling-material flow with a first volume VF enters the intake 2 of the thermal treatment device 1 and a second volume VT is branched off via the branch 8, 8' to create the branch flow, more filling material flows through the secondary side 4.2 than the primary side 4.1 of the first heat-exchanger 4, with the larger volume flow being (VT+VF) and the smaller volume flow being VF.

Due to this asymmetrical flow through the two sides of the first heat-exchanger 4, a greater proportion of thermal energy can be transferred from the smaller volume flow VF conveyed in the primary side 4.1 compared to the larger volume flow (VT+VF) conveyed in the secondary side 4.2 of the first heat-exchanger 4. This significantly improves the degree of efficiency of the combination of the first and second device-parts I, II.

Some embodiments feature a controllable branch-valve at the branch 8, 8' or a mixer 13 with controllable through flow. This permits regulating the volume of the branch flow that goes to the second device-part II. As a result, it is possible to select the volume rate of flow through the branch 8, 8', thereby providing control over the heat delivery into the second device-part II via the branch flow flowing through the heat-exchange section 10. For example, the heat delivered into the secondary process can correspond to part of or all of the thermal energy required in the secondary process.

In the particular embodiment of the thermal-treatment device 1 described herein, the primary process is pasteurization of sugar syrup and the secondary process is dissolving sugar in solvent to make the sugar syrup. However, many other combinations of primary and secondary process are possible. For example, the secondary process may include pre-heating a process liquid, for example in a pasteurizer or filling product pre-heating before a filling process.

With a further exemplary embodiment of the present invention, provision is made for the heat transfer from the primary process to the secondary process to take place not by the use of a separate heat exchanger that prevents a mixture of substances.

Instead of this, provision is made for at least a branch flow of the filling material itself being transferred from the primary process into the secondary process or vice-versa, and therein being mixed at least partially with at least a part quantity of the filling material. With this procedure it is therefore possible to do without an additional heat exchanger, which therefore makes it possible to avoid the temperature losses that are unavoidable with the additional heat exchanger.

This exemplary embodiment can advantageously be used, in particular, in situations in which the filling material that is to be pasteurized is a mixed product and/or a solution product such as a mixture of water and sugar dissolved in this water.

A mixing or collecting container is filled completely or partially with the filling material in the desired concentration and composition. If the mixing or collecting container is only partially filled with the filling material in the desired composition, then the components required for the production of the filling material can likewise be completely or partially contained in the mixing or collecting container. In any event, the filling material only leaves the mixing or collecting container when the filling material exhibits its desired composition. In this situation the filling material has a comparatively low temperature, for example a temperature of only 45-50° C.

This filling material is now conveyed directly out of the mixing or collecting container via the second pipeline 12 to the intake of the secondary side of the first heat-exchanger. As a rule, with this embodiment, the intake 2 is not provided. After flowing through the secondary sides of the first and, if applicable, also of the second heat-exchanger 4, 5, a branch flow of the heated filling material is again conveyed to the mixing or collecting container where this branch flow is mixed into the desired composition with the components or also with the filling material which is present there, and therefore heats them.

The invention has been described heretofore by way of exemplary embodiments. It is understood that a large number of modifications or derivations are possible, without thereby departing from the inventive concept underlying the invention.

The invention claimed is:

1. An apparatus for executing a primary process and a secondary process, wherein said primary process comprises thermal treatment of filling material, said apparatus comprising a branch, a primary-process section, a heat-exchange section, an intake, a first heat-exchanger, and a second heat-exchanger, wherein said intake receives a main flow of said filling material, wherein said primary process occurs in said primary-process section, wherein said secondary process occurs at a location that is disposed to be in thermal communication with said heat-exchange section, wherein said branch provides a path for diversion of filling material from said main flow to form a branch flow of filling material, wherein, as a result of said diversion, filling material that was proceeding towards said primary-process section for thermal treatment thereof is instead diverted away from said primary-process section, wherein said first heat-exchanger comprises a primary side and a secondary side, wherein said second heat-exchanger comprises a primary side and a secondary side, wherein a secondary-side inlet of said first heat-exchanger is connected to said intake, wherein a secondary-side outlet of said first heat-exchanger is connected to a secondary-side inlet of said second heat-exchanger, wherein a secondary-side outlet of said second heat-exchanger is connected to said primary-process section, wherein said primary-process section is connected, at an outlet side thereof, to said primary side of said first heat-exchanger, wherein said branch is disposed between said secondary-side outlet of said first heat-exchanger and said primary-process section, wherein said branch is connected to one of an inlet of said heat exchange section and an inlet of a mixing region, wherein, when said branch is connected to said inlet of said heat exchange section, thermal energy carried by said branch flow is conducted to said secondary process and an outlet of said heat-exchange section is connected to said secondary-side inlet of said first heat-exchanger, wherein, when said branch is connected to said inlet of said mixing region, said branch flow mixes with said main flow, as a result of which thermal energy carried by said branch flow is conveyed to said main flow, and wherein an outlet of said mixing region connects to said secondary-side inlet of said first heat exchanger.

2. The apparatus of claim 1, wherein said apparatus is further configured such that a first volume-flow flows through said secondary side of said first heat-exchanger, and a second volume-flow flows through said primary side of said first heat-exchanger, wherein said first volume-flow exceeds said second volume-flow.

3. The apparatus of claim 2, wherein said apparatus is further configured to control said first volume-flow by controlling said branch flow.

4. The apparatus of claim 1, wherein said branch is between said first heat-exchanger and said second heat-exchanger.

5. The apparatus of claim 1, wherein said branch is between said second heat-exchanger and said primary-process section.

6. The apparatus of claim 1, wherein heated heating medium flows through said primary side of said second heat-exchanger.

7. The apparatus of claim 1, wherein said primary-process section comprises a pasteurizing section.

8. The apparatus of claim 1, further comprising a secondary-process section at which said secondary process takes place, said secondary-process section being in thermal communication with said heat-exchanger section.

9. The apparatus of claim 1, further comprising said filling medium, wherein said filling medium is sugar dissolved in water.

10. The apparatus of claim 1, wherein said primary-process section comprises a helical pipe.

11. The apparatus of claim 1, wherein said branch flow is at a temperature between 75° C. and 100° C.

12. The apparatus of claim 1, further comprising a mixer disposed to promote mixing of said branch flow and said main flow.

13. The apparatus of claim 1, wherein said flow through said primary side of said first heat-exchanger and flow through said secondary side of said first heat-exchanger are in opposite directions and wherein said flow through said primary side of said second heat-exchanger and flow through said secondary side of said second heat-exchanger are in opposite directions.

14. The apparatus of claim 1, wherein said flow through said primary side of said first heat-exchanger and flow through said secondary side of said first heat-exchanger are asymmetric.

15. The apparatus of claim 1, wherein said branch flow has a volume that is regulated such that all heat required for said secondary process is delivered by said branch flow.

16. The apparatus of claim 1, wherein said flow through said primary side of said first heat-exchanger and flow through said secondary side of said first heat-exchanger differ by an extent defined by said branch flow.

17. The apparatus of claim 1, wherein said secondary-process section is configured to execute an endothermic secondary process.

18. The apparatus of claim 1, further comprising a pipe that carries a flow of externally-heated medium through said primary side of said second heat-exchanger.

19. A method comprising using an apparatus that comprises a primary-process section within which a primary process occurs, a heat-exchange section that is disposed to be in thermal communication with a location at which a secondary process occurs, an intake that receives a main flow of filling material, first and second heat-exchangers, each of which comprises a primary side and a secondary side, said first heat-exchanger comprising a secondary-side inlet connected to said intake and a secondary-side outlet connected to a secondary-side inlet of said second heat-exchanger, said second heat-exchanger comprising a secondary-side outlet connected to said primary-process section, wherein said primary-process section is connected, at an outlet side thereof, to said primary side of said first heat-exchanger, a branch that provides a path for diversion of filling material from said main flow to form a branch flow of filling material, said branch being disposed between said secondary-side outlet of said first heat-exchanger and said primary-process section and being connected to one of an inlet of said heat exchange section and an inlet of a mixing region, wherein, when said branch is connected to said inlet of said heat exchange section, thermal energy carried by said branch flow is conducted to said secondary process and an outlet of said heat-exchange section is connected to said secondary-side inlet of said first heat-exchanger, wherein, when said branch is connected to said inlet of said mixing region, said branch flow mixes with said main flow, as a result of which thermal energy carried by said branch flow is conveyed to said main flow, and wherein an outlet of said mixing region connects to said secondary-side inlet of said first heat exchanger, wherein using said apparatus comprises diverting a portion of said main flow to form a branch flow of filling material that proceeds away from said primary-process section to one of said inlet of said heat exchange section and said inlet of said mixing region, mixing said branch flow with said main flow and causing thermal energy carried by said branch flow to be conveyed to said main flow, and causing a mixture of said branch flow with said main flow to enter said first heat exchanger.

20. An apparatus for thermal treatment of a liquid or viscous filling material in a primary process, said apparatus comprising a first and a second heat-exchanger, each of which has a primary side and a secondary side, wherein a secondary-side intake of the first heat-exchanger is connected to an intake for the liquid or viscous filling material, wherein a secondary-side outlet of the first heat-exchanger is connected to a secondary-side intake of the second heat-exchanger, wherein a secondary-side outlet of the second heat-exchanger is connected to a process section, and wherein the process section is connected, on a discharge side thereof, to the primary side of the first heat-exchanger, wherein a branch between the secondary-side outlet of the first heat-exchanger and the process section permits a partial flow of the liquid or viscous filling material to be branched off, wherein the branch is connected to the intake of a heat-exchanger section so that thermal energy contained in the partial flow is fed to a secondary process, and wherein the outlet of the heat-exchanger section is connected to the secondary-side intake of the first heat-exchanger or the branch is connected to the intake of a mixing or collecting container, wherein the partial flow is mixed with the filling material or with components of the filling material, whereby thermal energy contained in the partial flow is conveyed to the filling material or to the components, and wherein an outlet of the mixing or collecting container is connected to the secondary side inlet of the first heat-exchanger.

* * * * *